Oct. 16, 1956 K. J. GUGE ET AL 2,767,245

SIGNAL LEVEL CONTROL FOR TRANSMITTERS

Filed April 29, 1953 2 Sheets-Sheet 1

INVENTORS
KENNETH J. GUGE, AND
PAUL J. MOORE

BY [signature]
AGENT

Oct. 16, 1956 K. J. GUGE ET AL 2,767,245

SIGNAL LEVEL CONTROL FOR TRANSMITTERS

Filed April 29, 1953 2 Sheets-Sheet 2

INVENTORS
KENNETH J. GUGE, AND
PAUL J. MOORE
BY D. A. Rechif
AGENT

United States Patent Office 2,767,245

Patented Oct. 16, 1956

2,767,245

SIGNAL LEVEL CONTROL FOR TRANSMITTERS

Kenneth J. Guge, Chicago, and Paul J. Moore, Arlington Heights, Ill.

Application April 29, 1953, Serial No. 351,918

15 Claims. (Cl. 179—4)

This invention relates to an automatic signal level control for transmitters, and more particularly to an arrangement for automatically controlling the level of modulating signals fed into a single sideband, suppressed carrier type of transmitter.

In a single sideband, suppressed carrier type of transmitter, the power output of the transmitter is approximately directly proportional to the sum of the amplitudes of the intelligence (modulating signals) applied thereto. The transmitter, of course, is capable of providing no more than a certain maximum output. It follows, therefore, that the sum of the amplitudes of the intelligence signals applied cannot exceed a certain predetermined level, a level corresponding to the maximum power output capabilities of the transmitter.

In many cases, a single transmitter must carry two types of intelligence signals, one being substantially continuous and the other discontinuous or intermittent. For example, the continuous intelligence might be a Teletype or facsimile signal, while the intermittent or discontinuous intelligence might be a telephone signal, which might have pauses of from several minutes to several hours between calls. Thus, two separate intelligence channels might be supplied to the same transmitter, one being a Teletype or facsimile channel in which the intelligence is substantially continuous and the other being a speech channel in which the intelligence is intermittent. The speech channel might be used, for example, for engineering cuing, rebroadcast program transmission, or telephone conferences.

In certain prior systems used for this same combination of continuous and occasional or intermittent intelligence, the modulation of the transmitter by the continuous signals was caused to be limited at all times to a value considerably less than 100% (e. g., 60%), in order not to overload the transmitter by a too-high level of summated intelligence signals when the intermittent-intelligence signals appeared. This procedure, while protecting the transmitter from overload, is quite inefficient in that the full power output capabilities of the transmitter are not utilized when only the continuous intelligence is present.

An object of this invention is to devise an arrangement wherein full or substantially 100% modulation of a transmitter by continuous intelligence is effected in the absence of intermittent intelligence, yet wherein the transmitter is protected from possible overloading when the intermittent intelligence appears.

Another object is to devise a system utilizing two intelligence channels feeding a common transmitter, wherein the appearance of intelligence signals in one channel causes the signal in the other channel to be attenuated to a predetermined degree.

Still another object is to devise a system utilizing two intelligence channels, wherein the appearance of intelligence signals in one channel causes the signal in the other channel to be attenuated to a predetermined degree, and wherein the intelligence signals in said one channel are caused to be attenuated in response to the increase in amplitude of such signals above a predetermined level.

A further object is to devise a novel system for automatically controlling the amplitude level of intelligence signals in two channels used for modulation of the same transmitter.

The objects of this invention are accomplished, briefly, in the following manner: A level reducing device or attenuating device, arranged to be operated by a relay, is inserted into a first channel connecting a source of continuous intelligence signals to a transmitter. The relay which operates this attenuating device is controlled in response to intelligence signals in a second channel connecting a source of intermittent intelligence signals to the same transmitter, in such a way that the attenuating device is removed from the first channel when the intermittent signals are not present in the second channel but is inserted into the first channel when the intermittent signals appear in the second channel. The intermittent signals may be of either variable amplitude or variable frequency. Another attenuating device may be inserted into the second channel and operated by a relay in such a way that the signal level in the second channel is reduced should the signals in this channel rise above a predetermined value.

The foregoing as well as other objects of the invention will be best understood from the following description of some exemplifications thereof, reference being had to the accompanying drawings, wherein.

Figure 1:
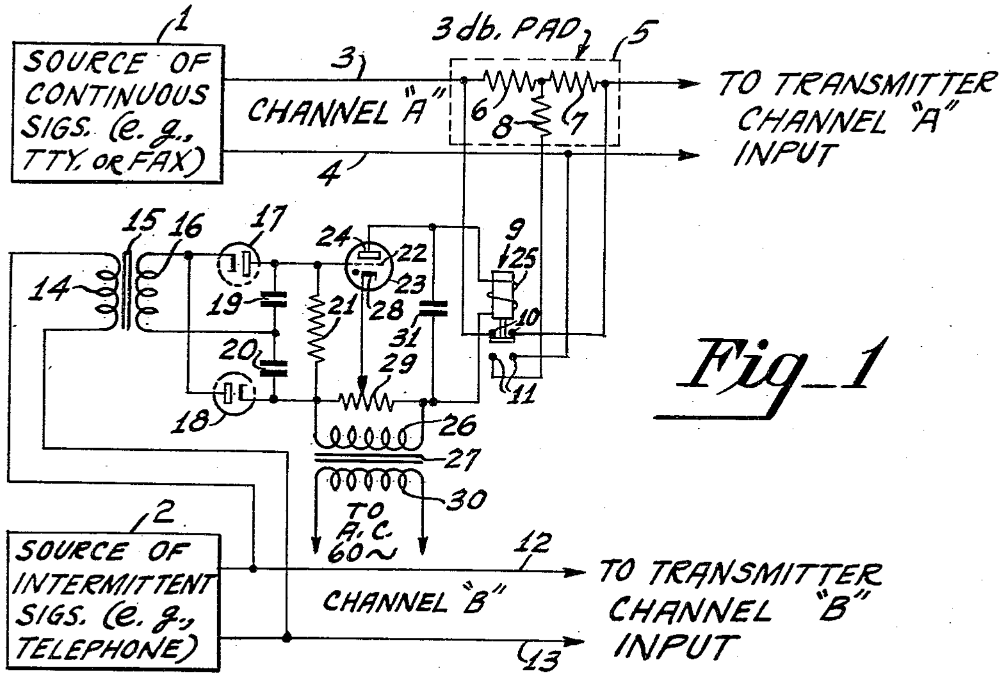
Fig. 1 is a schematic diagram of one embodiment of this invention.

Referring first to Fig. 1, two channels A and B are connected to both supply intelligence signals to a common transmitter, not shown. The transmitter may, by way of example, be a single sideband transmitter of the multichannel (two-channel, as illustrated) type, in which a total of two sidebands are used, but each one of which carries a separate intelligence. In other words, a single sideband is utilized for each of the two intelligences to be transmitted. The source 1 of the signals supplied to channel A provides signals which are essentially continuous in nature and this source may be constituted by one or more Teletype channels (for example, three Teletype channels), or a single facsimile channel. The source 2 of the signals supplied to channel B provides signals which are intermittent or discontinuous in nature and this source may be constituted by a telephone channel, in which there might be pauses of from several minutes to several hours between calls.

In a single sideband suppressed carrier transmitter of the type described, the power output of the transmitter is substantially directly proportional to the amplitude of the summated intelligence signals applied thereto. Since the transmitter has a maximum power output capability, it follows that the summated intelligence signal amplitudes must not exceed a value corresponding to this maximum transmitter power output. In conventional systems of the type wherein one of the intelligence channels carries substantially continuous signals and the other carries intermittent signals, the above-stated limitation on the summated intelligence signals cannot be met, without loss of efficiency in the operation of the system. In other words, in prior systems the transmitter can be modulated to a maximum of only about 60% by the continuous intelligence signals, to make certain that the limitation on the summated intelligence signals will not be exceeded when the intermittent intelligence signals (e. g., voice)

appear. This means that the maximum power output capabilities of the transmitter can not be utilized when the continuous intelligence signals alone are present; this results in a loss of efficiency in the operation of the system. According to the present invention, however, the maximum power output capabilities of the transmitter are utilized at all times, even when the continuous intelligence signals alone are present; along with this, the limitation on the summated intelligence signals is not exceeded (thus preventing overloading of the transmitter) when the intermittent intelligence signals appear. The way in which this is accomplished will become apparent from the description which follows.

The two conductors 3 and 4 of channel "A" have inserted therein, between signal source 1 and the transmitter, a signal level reducing device, illustrated in the form of a 3 db attenuating pad 5 comprising two series-connected resistors 6 and 7 inserted in conductor 3 and a shunting resistor 8 one end of which is connected to the junction between resistors 6 and 7. The pad 5 is controlled by a relay 9 in such a way as to be selectively inserted into or removed from the conductors of channel "A," by operation of such relay. During "normal" operation (that is when only the signals of channel "A" are being applied to the transmitter and when there are no intelligence signals whatever in channel "B") the relay 9 is closed or energized, and has the position illustrated, in which its contacts 10 are closed and in which its contacts 11 are open.

A lead extends from one of the contacts 10 to the source side of resistor 6, while another lead extends from the other one of the contacts 10 to the transmitter side of resistor 7. A lead extends from the other end (that is, the end not connected to the common junction between resistors 6 and 7) of resistor 8 to one of the contacts 11, while another lead extends from the other one of the contacts 11 to channel conductor 4. Thus, when relay 9 is in the closed or energized position illustrated (the "normal" position), contacts 10 are closed and shunt the two series resistors 6 and 7, while contacts 11 are open and open-circuit the shunting resistor 8. Under these conditions, then, pad 5 is effectively removed from the conductors of channel "A," and the intelligence signals in channel "A" travel from source 1 to the transmitter without any noticeable attenuation.

When relay 9 is deenergized (how this relay is energized and deenergized will be described hereinafter), its contacts 10 are opened and its contacts 11 are closed. This opens the shunt around series resistors 6 and 7 and connects the shunting resistor 8 between conductors 3 and 4. Under these conditions, pad 5 is effectively inserted into the conductors of channel "A" and the intelligence signals in channel "A" are caused to be attenuated 3 db (50% in power) in traveling from source 1 to the transmitter. Thus, when relay 9 is deenergized, the signals in channel "A" (Teletype tones, for example) are reduced or attenuated 3 db.

The relay 9 is controlled in response to intelligence signals in channel "B," in such a way that said relay is energized or closed when there are no intelligence signals in this channel, and is caused to be deenergized or opened when the intermittent intelligence signals appear in channel "B." The control circuit for relay 9 starts with the application of a portion of the signal energy appearing in the two conductors 12 and 13 of channel "B" to the primary winding 14 of a transformer 15, by connecting the two ends of winding 14 to the respective conductors 12 and 13. One end of the secondary winding 16 of transformer 15 is connected to the cathode of a diode electron discharge device structure 17 and also to the anode of a similar diode electron discharge device structure 18. The two diode structures may be in a common envelope, as indicated, and a twin-diode 6H6 tube may, for example, be used for the two structures 17 and 18. Two capacitors 19 and 20 are connected to be charged through the respective diode structures 17 and 18, by connecting these two capacitors in series between the anode of structure 17 and the cathode of structure 18, and by connecting the common junction of said capacitors to the other end of secondary winding 16. Thus, when alternating electrical energy (such as audio energy, for example) is produced by intermittent source 2 and applied to transformer 15, during the half-cycle of such energy when the upper end of winding 16 is positive with respect to its lower end, current will flow through diode 18 and capacitor 20, charging this capacitor with such a polarity that its upper plate becomes negative with respect to its lower plate. During the half-cycle of alternating energy when the lower end of winding 16 is positive with respect to its upper end, current will flow through capacitor 19 and diode 17, charging this capacitor with such a polarity that its upper plate becomes negative with respect to its lower plate. Thus, the voltages appearing across the series capacitors 19 and 20 are in series aiding relation.

A leak or discharge resistor 21 is connected across the two capacitors 19 and 20, and the upper end of this resistor (and also the upper plate of capacitor 19) is connected to the control grid 22 of a gaseous discharge device 23, which may be a type 2051 thyratron. The thyratron 23 is illustrated as being a triode, since a triode is all that is required. If a 2051 type is used, the #2 grid may be connected to the #1 grid thereof or to the anode thereof. The device 23 is arranged to be energized from the A. C. power line (for example, 115 volts, 60 cycles per second) by connecting the anode 24 of device 23 through the winding 25 of relay 9 to one end of the secondary winding 26 of transformer 27 and by connecting the cathode 28 of device 23 to the movable tap on a potentiometric resistance 29 connected across secondary 26. The other end of secondary 26 is connected to the lower plate of capacitor 20. The primary winding 30 of transformer 27 is energized from the alternating current power mains, as indicated. A capacitor 31 is connected across relay winding 25, to eliminate relay chatter.

Normally (that is, when source 2 is "dead" and produces no intelligence signals to provide energy in transformer winding 14) capacitors 19 and 20 are discharged and thus no negative bias is applied to device 23. The movable tap on resistor 29 is so adjusted as to cause device 23 to fire or conduct during alternate half-cycles of the applied alternating current under these conditions, that is, when no negative bias is applied to this device as a result of signals in channel "B." This movable tap provides in effect a bias adjustment for device 23. Under these "normal" conditions device 23 is conducting and relay 9 is closed or energized to take up the position illustrated, due to the current flowing through relay winding 25 which is in series with the anode-cathode path of device 23. Relay 9 is thus energized during alternate half-cycles of the applied alternating current, but is held closed and kept from chattering by capacitor 31. Under these "normal" conditions (when source 2 is "dead"), the pad 5 in channel "A" is shorted out or effectively removed from the circuit, due to the closing of relay contacts 10 and the opening of relay contacts 11. Then, the signals from source 1 flow unattenuated to the transmitter, and full or 100% modulation of the transmitter by the intelligence signals from this source may be effected.

Now, assume that intelligence signals are produced by the source 2 of intermittent signals, so that signal energy appears in channel "B" and in the primary of transformer 15. If this source 2 is a telephone channel, the initiation of a telephone call will cause signal energy to appear in channel "B." As previously stated, thyratron 23 is normally conducting and is conducting at the time that the intermittent (e. g., voice) signals first appear in channel "B." The grid 22 of the conducting thyratron presents a low impedance load to the diodes 17 and 18, and in turn a low impedance is presented by the diodes to the source 2 through transformer 15. Thus, when the intermittently-appearing audio signals first appear on channel "B," there is a low impedance, virtually a short circuit, across the line conductors 12 and 13 of channel "B." Therefore, the signals appearing on channel "B" are initially short-circuited and prevented from reaching the transmitter and thus prevented from initially adding to the channel "A" signals (which at the time are utilizing the full 100% amplitude capabilities of the transmitter), thus preventing initial overloading of the transmitter which would result from attempting to force it to operate beyond its maximum power capabilities as a result of the application thereto of an excessively high amplitude modulating signal. Along with this, intermodulation of the various tones and signals (which would result from overloading of the transmitter due to excessively high amplitude of the summated modulating signals) is prevented.

Simultaneously with the initial appearance of signal energy in channel "B" and in transformer 15, the capacitors 19 and 20 begin charging through the diode structures 17 and 18, in the manner above described. The polarities of the voltages developed across these two capacitors (as previously described) are such as to aid each other and are such that the lower plate of capacitor 20 (connected to cathode 28) is positive with respect to the upper plate of capacitor 19 (connected to grid 22). This applies a negative bias voltage to the grid 22 of device 23 in a direction tending to cut off this gas tube. When the capacitors 19 and 20 are charged, the voltage across them (the negative bias voltage referred to) biases tube 23 beyond cutoff, and it ceases to conduct. When the thyratron 23 stops conducting, its grid presents a high impedance to diodes 17 and 18, which is reflected through such diodes as a high impedance across channel "B" conductors 12 and 13; this removes the short-circuit across channel "B" and allows the channel "B" signals to reach the transmitter with substantially their original amplitude.

At the same time, when tube 23 ceases to conduct, the current through relay coil 25 ceases and relay 9 is deenergized so that said relay opens, closing its contacts 11 and opening its contacts 10. This inserts the 3 db pad 5 (including resistors 6, 7 and 8) into channel "A," reducing or attenuating the signals in channel "A" by 3 db (50% in power), so that the summated amplitudes of the intelligence signals in channels "A" and "B" will now not exceed the maximum permissible summated amplitude, and the common transmitter will not be overloaded.

Thus, it may be seen that this invention operates to permit full or 100% modulation of the transmitter by the Teletype tones (the continuous signals of source 1) until it is required that voice (the intermittent signals of source 2) be transmitted, when the Teletype tones in channel "A" are automatically reduced 3 db, in response to the appearance of voice signals of channel "B," so that channel "B" can transmit voice without overloading the transmitter. When the intermittent voice signals appear, there is virtually a short-circuit on channel "B" until the capacitors become charged to open the relay and insert the 3 db pad in channel "A"; thus, the transmitter is never overloaded.

When the intermittent signals disappear from channel "B," the charges on capacitors 19 and 20 leak off through resistor 21, causing the negative bias voltage to be removed from thyratron 23. This thyratron then conducts, energizing relay 9 to again effectively remove the pad 5 from channel "A," so that the signals in this channel again pass therethrough with substantially no decrease in amplitude, thus again modulating the transmitter 100% by these continuous signals. At the same time, the initial low impedance on channel "B" is reestablished. The time constant of the RC network 19, 20, 21 is preferably several seconds long, so that the charge will not leak off these capacitors (thereby operating or energizing the relay 9) between words of the telephone conversation being transmitted on channel "B."

Figure 2:
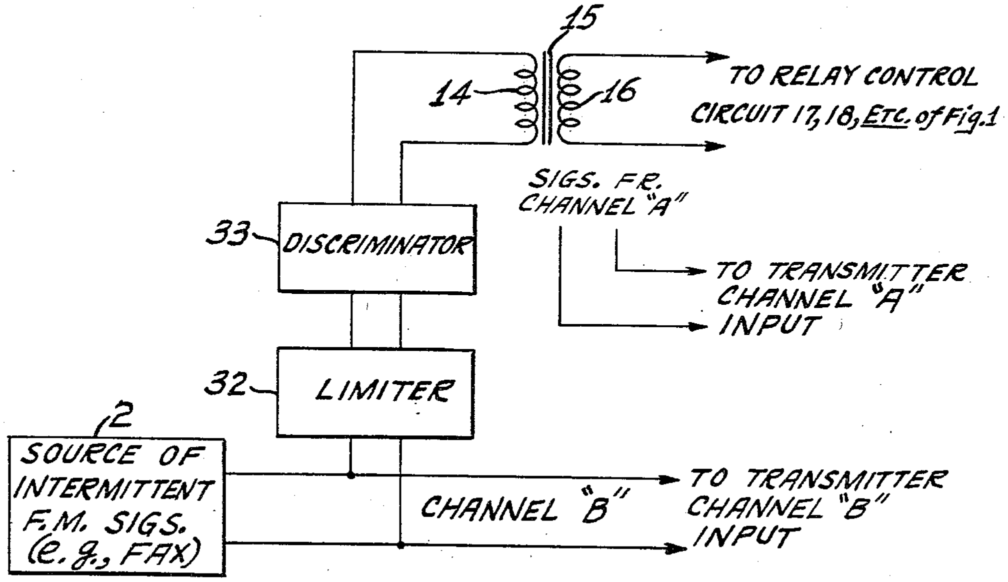
Fig. 2 is a partial diagram of a modification of Fig. 1.

Fig. 2 is a partial diagram of a modification of Fig. 1. In Fig. 2, parts the same as those of Fig. 1 are denoted by the same reference numerals. In Fig. 2, the source 2 of intermittent signals is adapted to supply an intermittent frequency modulated intelligence signal to channel "B." This source could be, for example, a source of facsimile signals, which are frequency modulated audio or tone signals. Source 2, when "dead" or not transmitting intelligence signals, does not provide a frequency modulated signal to channel "B," although under these conditions it may provide a constant frequency signal to channel "B."

A portion of the signal energy of channel "B" is applied to a limiter 32 which removes amplitude variations from this signal. The limiter 32 may be of conventional type, so is represented in Fig. 2 by a block. The output of limiter 32 is fed into a frequency discriminator-detector 33 which acts to convert frequency variations of the input signal thereto into an output voltage of varying amplitude, but which provides zero voltage output in response to a fixed-frequency input signal thereto. Discriminator 33 may also be of any conventional type. The output of discriminator-detector 33 is fed to the primary winding 14 of transformer 15 and the secondary 16 of this transformer is connected to a relay control circuit 17, 18, etc. exactly the same as previously described in connection with Fig. 1.

In Fig. 2, as in Fig. 1, the cathode tap on a potentiometric resistor 29 for the gaseous device 23 is so adjusted, in the absence of a frequency modulated signal in channel "B," that the device 23 is firing or conducting and the gas-tube-operated relay 9 is energized or closed. Under these conditions, in the absence of a frequency modulated signal in channel "B," there is zero voltage output out of the discriminator, even though there may at this time be a fixed-frequency signal in channel "B," so that the capacitors 19 and 20 of the relay control circuit are not charged and thus provide no negative bias on gas tube 23. When the gas-tube-operated relay 9 is energized or closed, the attenuating pad 5 is removed from channel "A" and signals travel through this channel substantially without attenuation. Thus, when only the continuous signals are present, the transmitter may be fully modulated (100% modulated) by such signals.

When a frequency modulated signal is present or appears in channel "B," the limiter 32 and discriminator 33 act to produce an audio voltage which appears in the secondary winding 16 of transformer 15 and is applied to the diodes 17 and 18 of the relay control circuit, to charge the capacitors 19 and 20 of this circuit through the diodes. The capacitors are charged in a direction such as to bias the gas tube 23 to cutoff. When this tube cuts off, the gas-tube-operated relay 9 opens and inserts the level reducing device (pad 5) in channel "A," reducing the level of the signals in this channel to a value such that, when they are combined with the channel "B" signals, the transmitter will not be overloaded.

Figure 3:
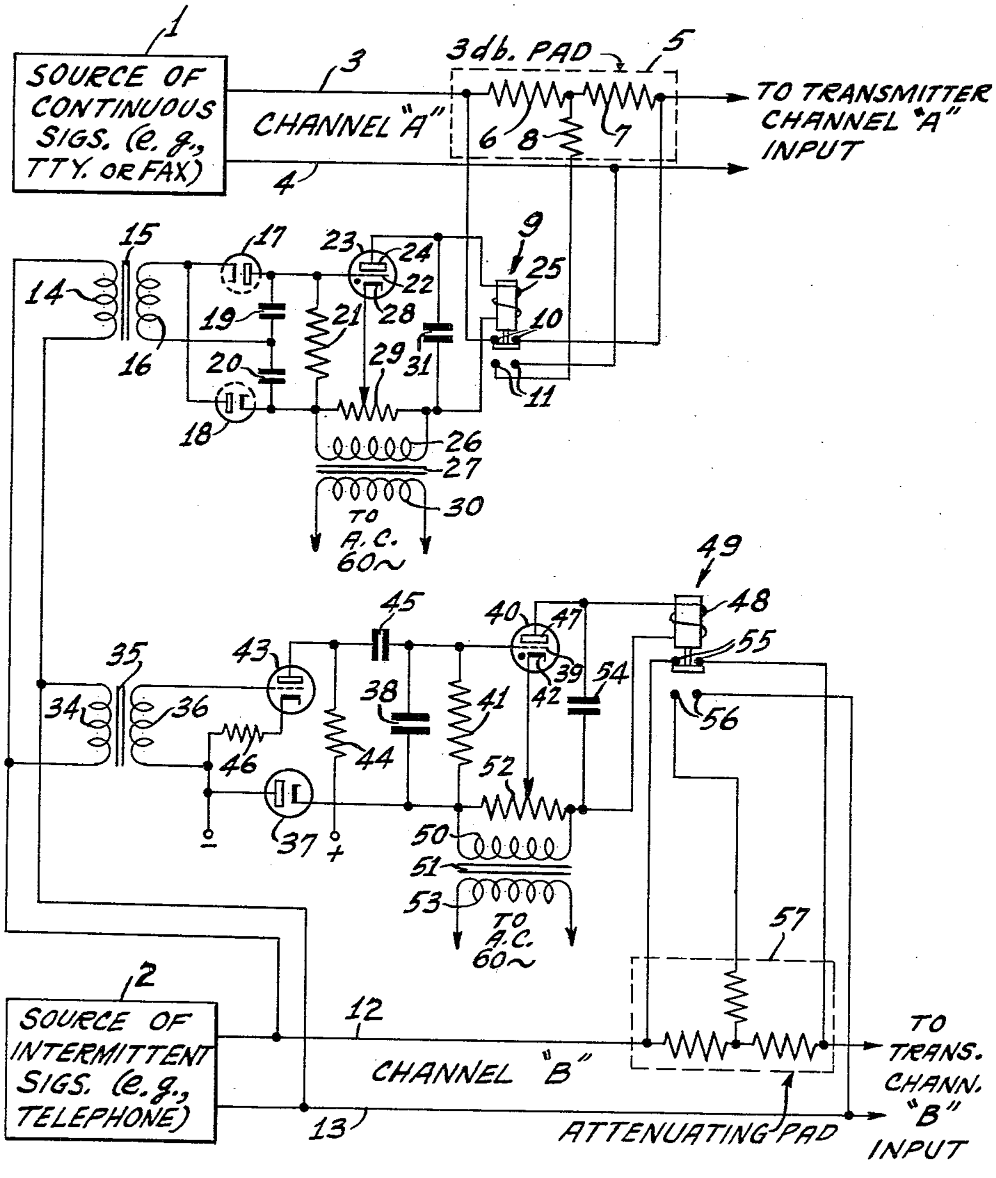
Fig. 3 is a schematic diagram of another embodiment of the invention.

Fig. 3 discloses another embodiment of the invention wherein, in addition to the amplitude control operating to increase the attenuation in channel "A" in response to the appearance of signals in channel "B," there is a second amplitude control which operates to increase the attenuation in channel "B" (thus reducing the signal level in this channel) whenever the signal level rises to or goes above a certain predetermined level, as a result of either additional signals in channel "B" or an increase in amplitude of the signals from the "B" signal source.

In Fig. 3, elements the same as those of Fig. 1 are denoted by the same reference numerals. In Fig. 3, the amplitude control circuit including the elements numbered 9–11, inclusive and 14–31, inclusive is exactly the same as in Fig. 1 and operates in exactly the same manner, so the description thereof will not be repeated.

In Fig. 3, a second amplitude control, operating to limit or reduce the amplitude of high level signals in channel "B," is provided. This second amplitude control is somewhat similar to that of Fig. 1, in that a relay-operated attenuating pad (level reducing device) is utilized. The intermittent signals appearing in channel "B," in addition to their application to the transmitter and to the primary winding 14 of transformer 15, are applied to the primary winding 34 of a transformer 35, winding 34 being connected across the channel "B" conductors 12 and 13. One end of the secondary 36 of transformer 35 is connected to the anode of a diode electron discharge device structure 37 (e. g., one-half of a type 6H6 tube) the cathode of which is connected to the lower plate of a capacitor 38, in such a way as to charge said capacitor by half-wave rectification through 37, with the lower plate of said capacitor becoming positive with respect to its upper plate.

The upper plate of capacitor 38 is connected to the control grid 39 of a gaseous discharge device 40 which is normally conducting. Device 40 may be a type 2051 thyratron, for example. A leak resistor 41 is connected across capacitor 38, and the lower plate of capacitor 38 is connected to the cathode 42 of gas tube 40. The control grid of device 40, which is normally conducting, offers a low impedance. In order to prevent this low impedance from short-circuiting the signals in "B" channel, and in order to complete the charging circuit for capacitor 38, an isolation amplifier stage including a triode 43 is used. Triode 43 may be, for example, of the 6J5 type. The anode of triode 43 is connected through a load resistor 44 to the positive terminal of a voltage source and also through a coupling capacitor 45 to grid 39 of gas tube 40. The grid of triode 43 is connected to the end of secondary 36 opposite to that to which the anode of device 37 is connected, while the cathode of triode 43 is connected through a cathode bias resistor 46 to the anode of diode 37 and to the negative terminal of the voltage source. Triode 43 isolates the low impedance offered by grid 39 (when tube 40 is conducting) from channel "B," thus preventing short-circuiting of the "B" channel signals by this low impedance.

Device 40, like device 23, is energized from the A. C. power line by connecting the anode 47 thereof through the winding 48 of a relay 49 to one end of the secondary winding 50 of a transformer 51 and by connecting the cathode 42 of device 40 to the movable tap on a potentiometric resistance 52 connected across secondary 50. The other end of secondary 50 is connected to the lower plate of capacitor 38. The primary winding 53 of transformer 51 is energized from the alternating current power mains, as indicated. A capacitor 54 is connected across relay winding 48, to eliminate relay chatter.

The tap on resistance 52 is adjusted so that device 40 is normally firing or conducting and will continue to do so until a predetermined signal level in channel "B" is exceed. Current is thus normally flowing through relay winding 48 and relay 49 is energized, having the position illustrated in which its contacts 55 are closed and its contacts 56 open. An attenuating pad 57 is associated with the channel "B" conductors in exactly the same manner as pad 5 is associated with the channel "A" conductors, and pad 57 is arranged to be controlled by relay 49 in exactly the same manner as pad 5 is controlled by relay 9. That is, contacts 55 of relay 49 correspond exactly to contacts 10 of relay 9, and contacts 56 of relay 49 correspond exactly to contacts 11 of relay 9. Thus, when relay 49 is energized (its normal condition), pad 57 is effectively removed from channel "B," while when this relay is deenergized (closing contacts 56 and opening contacts 55) pad 57 is inserted into channel "B," to cause a predetermined degree of signal attenuation in this channel.

Device 40 being normally conducting and relay 49 energized, pad 57 is removed from channel "B," so that the signals pass through this channel without any attenuation.

Now, should the signals in channel "B" rise to or go above a predetermined level (due to additional signals in this channel or to an increase in the amplitude of such signals), device 40 will be biased off by the negative voltage built up on capacitor 38 by half-wave rectification and charging through diode 37. The setting of the cathode tap on resistance 52 determines the amplitude level which must be reached by the signals in channel "B," before the tube 40 is biased off. When tube 40 ceases to conduct, relay 49 is deenergized and releases, to insert attenuating pad 57 into the "B" channel conductors. Under these conditions, the signals in channel "B" are reduced or attenuated. Thus, the signal level applied to the transmitter from intermittent source 2 is reduced whenever the "B" signals go to or increase above a predetermined amplitude level. When the "B" signals drop back below this predetermined level, the negative bias on tube 40 is removed (due to the discharge of capacitor 38); then this tube again conducts to energize relay 49 and remove pad 57 from the channel "B" conductors.

Although this invention has been described in connection with a single sideband, suppressed carrier transmitter of the multi-channel type, it is desired to be pointed out that it is not limited thereto. The invention can be used in any multiplexing arrangement wherein one of the signals is substantially continuous and another is intermittent in nature.

What is claimed is:

1. An overload protection system comprising a plurality of signal channels connected to a common output circuit, means causing a substantially continuous intelligence signal to flow along one of said channels, means causing a discontinuous intelligence signal to flow along another of said channels, signal attenuating means adapted to be connected into said one channel, and means responsive to the presence of signals in said other channel only for connecting said attenuating means into said one channel.

2. An overload protection system comprising a plurality of signal channels connected to a common output circuit, a source of substantially continuous intelligence signals coupled to one of said channels, a source of discontinuous intelligence signals coupled to another of said channels, signal attenuating means adapted to be connected into and disconnected from said one channel, and means acting to connect said attenuating means into said one channel in response to the presence of signals in said other channel only and also acting to disconnect said attenuating means from said one channel in response to the absence of signals in said other channel only.

3. An overload protection system for transmitters comprising a plurality of modulating signal channels connected to a common transmitter to enable modulation of the same, means causing a substantially continuous intelligence signal to flow along one of said channels, means causing a discontinuous intelligence signal to flow along another of said channels, signal attenuating means adapted to be connected into said one channel, and means responsive to the presence of signals in said other only for connecting said attenuating means into said one channel.

4. An overload protection system for transmitters comprising a plurality of modulating signal channels connected to a common transmitter to enable modulation of the same, a source of substantially continuous intelligence signals coupled to one of said channels, a source of discontinuous intelligence signals coupled to another of said channels, signal attenuating means adapted to be connected into and disconnected from said one channel, and means acting to connect said attenuating means into said one channel in response to the presence of signals in said other channel only and also acting to disconnect said attenuating means from said one channel in response to the absence of signals in said other channel only.

5. An overload protection system comprising a pair of signal channels connected to a common output circuit, means causing a substantially continuous intelligence signal to flow along the first channel, means causing a discontinuous intelligence signal to flow along the second channel, a signal attenuating network adapted to be connected into the first channel, and a control circuit coupled to the second channel only, said control circuit acting to connect said network into the first channel in response to the presence of signals in the second channel only, said control circuit being constructed and arranged to present a low impedance to the second channel prior to the connection of said network into the first channel.

6. An overload protection system comprising a plurality of signal channels connected to a common output circuit, a source of substantially continuous intelligence signals coupled to one of said channels, a source of discontinuous intelligence signals coupled to another of said channels, a signal attenuating network adapted to be connected into and disconnected from said one channel, and a control circuit coupled to said other channel only, said control circuit acting to connect said network into said one channel in response to the presence of signals in said other channel only and also acting to disconnect said network from said one channel in response to the absence of signals in said other channel only.

7. An overload protection system for transmitters comprising a pair of modulating signal channels connected to a common transmitter to enable modulation of the same, means causing a substantially continuous intelligence signal to flow along the first channel, means causing a discontinuous intelligence signal to flow along the second channel, a signal attenuating network adapted to be connected into the first channel, and a control circuit coupled to the second channel only, said circuit acting to connect said network into the first channel in response to the presence of signals in the second channel only, said circuit being constructed and arranged to present a low impedance to the second channel prior to the connection of said network into the first channel.

8. An overload protection system comprising a plurality of signal channels connected to a common output circuit, means causing a substantially continuous intelligence signal to flow along one of said channels, means causing a discontinuous intelligence signal to flow along another of said channels, signal attenuating means adapted to be connected into said one channel, means acting to connect said attenuating means into said one channel in response to the presence of signals in said other channel only, signal attenuating means adapted to be connected into said other channel, and means acting to connect said last-named attenuating means into said other channel in response to the reaching of a predetermined amplitude level by the signals flowing along said other channel.

9. An overload protection system for transmitters comprising a plurality of modulating signal channels connected to a common transmitter to enable modulation of the same, means causing a substantially continuous intelligence signal to flow along one of said channels, means causing a discontinuous intelligence signal to flow along another of said channels, signal attenuating means adapted to be connected into said one channel, means acting to connect said attenuating means into said one channel in response to the presence of signals in said other channel only, signal attenuating means adapted to be connected into said other channel, and means acting to connect said last-named attenuating means into said other channel in response to the reaching of a predetermined amplitude level by the signals flowing along said other channel.

10. An overload protection system for transmitters comprising a pair of modulating signal channels connected to a common transmitter to enable modulation of the same, means causing a substantially continuous intelligence signal to flow along the first channel, means causing a discontinuous intelligence signal to flow along the second channel, signal attenuating means adapted to be connected into the first channel, means acting to connect said attenuating means into the first channel in response to the presence of signals in the second channel only, a signal attenuating network adapted to be connected into the second channel, and a control circuit coupled to the second channel, said circuit acting to connect said network into the second channel in response to the reaching of a predetermined amplitude level by the signals flowing along the second channel.

11. An overload protection system comprising a plurality of signal channels connected to a common output circuit, a source of substantially continuous intelligence signals coupled to one of said channels, a source of discontinuous intelligence signals coupled to another of said channels, signal attenuating means adapted to be connected into said one channel, means acting to connect said attenuating means into said one channel in response to the presence of signals in said other channel only, a signal attenuating network adapted to be connected into said other channel, and a control circuit coupled to said other channel, said control circuit acting to connect said network into said other channel in response to the reaching of a predetermined amplitude level by the signals flowing along said other channel, said control circuit being constructed and arranged to present a high impedance to said other channel.

12. An overload protection system for transmitters comprising a pair of modulating signal channels connected to a common transmitter to enable modulation of the same, a source of substantially continuous intelligence signals coupled to the first channel, a source of discontinuous intelligence signals coupled to the second channel, a signal attenuating network adapted to be connected into the first channel, a control circuit coupled to the second channel only, said circuit acting to connect said network into the first channel in response to the presence of signals in the second channel only, said circuit being constructed and arranged to present a low impedance to the second channel prior to the connection of said network into the first channel, a signal attenuating network adapted to be connected into the second channel, and a control circuit coupled to the second channel, said last-named circuit acting to connect said last-named network into the second channel in response to the reaching of a predetermined amplitude level by the signals flowing along the second channel, said last-named circuit being constructed and arranged to present a high impedance to the second channel.

13. An overload protection system comprising a plurality of signal channels connected to a common output circuit, means causing a substantially continuous intelligence signal to flow along one of said channels, means causing a discontinuous intelligence signal to flow along another of said channels, signal attenuating means in said one channel, and means responsive to the absence of signals in said other channel only for effectively disabling said attenuating means.

14. An overload protection system comprising a plurality of signal channels connected to a common ouput circuit, means causing an intelligence signal to flow along one of said channels, means causing an intelligence signal to flow along another of said channels, signal attenuating means in one of said channels, and means acting to effectively disable said attenuating means in response to a decrease of the signal level in another of said channels only, below a predetermined value.

15. In combination, two intelligence-carrying channels connected to a common transmitter, an attenuating pad in the first of said channels, two-position relay means effective to disable said pad in one of its positions and to enable said pad in the other of its positions, and means for operating said relay means to enable said pad in response to the presence of signals in the second of said channels and to disable said pad in response to the absence of signals in said second channel, whereby a maximum-amplitude signal is conveyed to said transmitter by said first channel when signals are absent in said second channel and a reduced-amplitude signal is conveyed to said transmitter by said first channel when signals are present in said second channel.

References Cited in the file of this patent

UNITED STATES PATENTS

| | | |
|---|---|---|
| 2,058,198 | Whittle | Oct. 20, 1936 |
| 2,261,628 | Lovell | Nov. 4, 1941 |
| 2,300,415 | Green | Nov. 3, 1942 |
| 2,343,471 | Nixon | Mar. 7, 1944 |
| 2,421,333 | Katchatouroff | May 27, 1947 |
| 2,505,585 | Silent | Apr. 25, 1950 |